United States Patent
Nusser

(10) Patent No.: US 6,974,497 B2
(45) Date of Patent: Dec. 13, 2005

(54) MONOAZO DYES

(75) Inventor: Rainer Nusser, Neuenburg (DE)

(73) Assignee: Clariant Finance (BVI) Limited, Tortola (VG)

( * ) Notice: Subject to any disclaimer, the term of this patent is extended or adjusted under 35 U.S.C. 154(b) by 43 days.

(21) Appl. No.: 10/398,557

(22) PCT Filed: Sep. 27, 2001

(86) PCT No.: PCT/IB01/01783

§ 371 (c)(1),
(2), (4) Date: Apr. 8, 2003

(87) PCT Pub. No.: WO02/31057

PCT Pub. Date: Apr. 18, 2002

(65) Prior Publication Data

US 2004/0137565 A1 Jul. 15, 2004

(30) Foreign Application Priority Data

Oct. 10, 2000 (CH) .............................................. 1993/00

(51) Int. Cl.⁷ ...................... C09D 11/02; C09B 62/255; C09B 62/095; C09B 45/18
(52) U.S. Cl. ............................. 106/31.48; 8/549; 8/686; 534/622; 534/627; 534/701; 534/803
(58) Field of Search ............................ 106/31.48; 8/549, 8/674, 686; 534/701, 803, 622, 627

(56) References Cited

U.S. PATENT DOCUMENTS

| | | | |
|---|---|---|---|
| 3,288,777 A | | 11/1966 | Benz et al. .................. 260/146 |
| 4,740,597 A | | 4/1988 | Franke et al. ................ 544/211 |
| 5,436,324 A | * | 7/1995 | Reddig et al. ............... 534/625 |
| 5,496,381 A | * | 3/1996 | Russ et al. ...................... 8/549 |
| 5,538,518 A | | 7/1996 | Reddig et al. .................. 8/549 |
| 5,583,207 A | | 12/1996 | Nusser et al. ................ 534/624 |
| 5,721,343 A | * | 2/1998 | Doswald et al. ............. 534/622 |
| 5,972,084 A | * | 10/1999 | Lacroix et al. ........... 106/31.36 |
| 6,379,442 B1 | * | 4/2002 | Lavery et al. ............. 106/31.51 |
| 6,410,698 B1 | * | 6/2002 | Prechtl et al. ............... 534/638 |
| 6,500,247 B1 | * | 12/2002 | Lehmann et al. ......... 106/31.51 |
| 6,530,961 B1 | * | 3/2003 | Schrell et al. .................. 8/549 |
| 6,815,536 B2 | * | 11/2004 | Huang et al. ................... 8/549 |
| 2003/0060608 A1 | * | 3/2003 | Hasemann et al. ......... 534/618 |

FOREIGN PATENT DOCUMENTS

| | | |
|---|---|---|
| CH | 425 039 | 11/1966 |
| EP | 0 172 790 | 2/1986 |
| EP | 0 365 486 | 4/1990 |
| EP | 0 499 588 | 8/1992 |
| EP | 0 526 792 | 2/1993 |
| FR | 2 436 167 | 4/1980 |
| GB | 2 031 931 | 4/1980 |
| GB | 2 270 923 | 3/1993 |
| WO | WO 01/72907 A1 * | 10/2001 |

OTHER PUBLICATIONS

English abstract for EP 04999588, Aug. 19, 1992.
PCT International Preliminary Search Report for application No. PCT/IB01/01783, mail date of Feb. 12, 2003.

* cited by examiner

*Primary Examiner*—Helene Klemanski
(74) *Attorney, Agent, or Firm*—Tod A. Waldrop

(57) ABSTRACT

Claimed are compounds of formula (I) where the substituents are each as defined in the claims, their preparation, their use as dyes and as a ingredients of an ink-jet printing ink and also substrates dyed with such compounds.

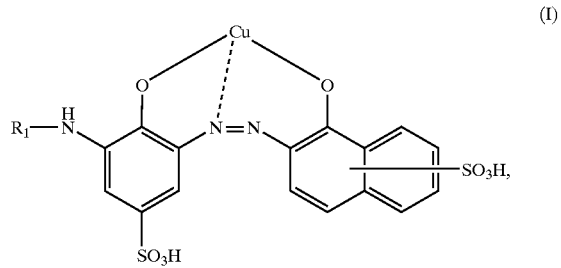

8 Claims, No Drawings

MONOAZO DYES

This invention relates to novel monoazo dyes of the formula (I)

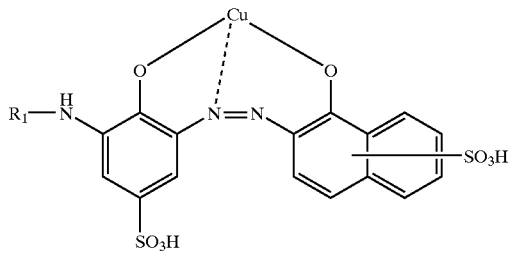
(I)

where $R_1$ is

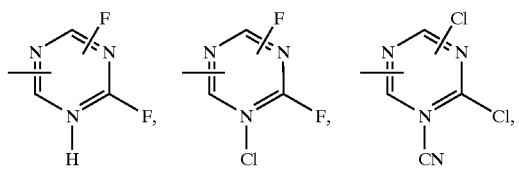

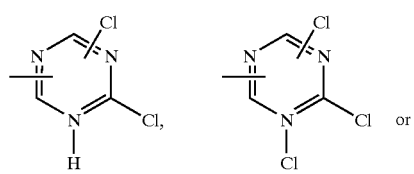

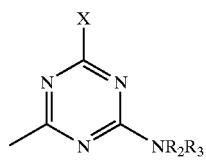

where
- X is a halogen atom, preferably a chlorine or fluorine atom, and
- $R_2$ and $R_3$ are independently, hydrogen; a $C_{5-8}$-cycloalkyl radical; a $C_{1-4}$-alkyl radical; a $C_{1-4}$-alkyl which is substituted by one or more radicals from the group —OH, —$NH_2$, —COOH and —$SO_3H$ and which may be additionally interrupted by one or more heteroatoms, especially from the group consisting of —O—, —$NR_4$— and —$SO_2$—; -A-$SO_2$—B;

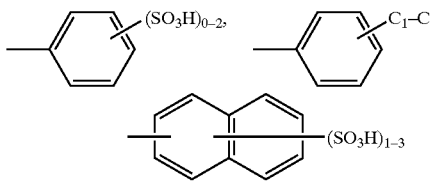

where
- $R_4$ is hydrogen or a $C_{1-4}$-alkyl radical,
- A is a $C_{2-6}$-alkylene group, preferably a $C_{2-4}$-alkylene group; a $C_{2-6}$-alkylene group, preferably a $C_{2-4}$-alkylene group which may be interrupted by one or more heteroatoms selected from the group consisting of —O—, —$NR_4$— and —$SO_2$—; a $C_{5-8}$-cycloalkylene or a phenylene group which may be substituted by a $C_{1-4}$-alkyl group; wherein $R_4$ is as defined above;
- B is —CH=$CH_2$ or —$CH_2$—$CH_2$-Z, where Z is any group that is detachable by alkali; or
- $R_2$ and $R_3$ may be combined with the nitrogen atom to which they are bonded to form a hetero ring of 4 to 8 atoms in which an additional heteroatom from the group consisting of O, N and S may be incorporated, and also mixtures thereof and their salts.

Useful cations for salt formation are alkali metal or alkaline earth metal cations in particular.

In preferred compounds, $R_1$ is

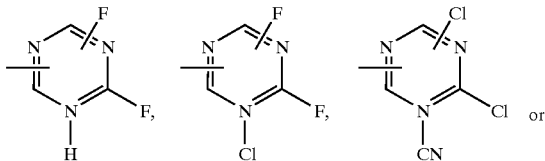

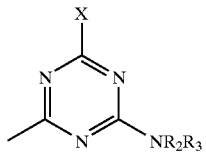

where
- X is a chlorine or fluorine atom, and
- $R_2$ is hydrogen; a $C_{1-2}$-alkyl radical or a $C_{1-2}$-alkyl which is substituted by one or more radicals from the group —OH, —$NH_2$ or —COOH,
- $R_3$ is a $C_{5-8}$-cycloalkyl radical; a $C_{1-2}$-alkyl which is substituted by one or more radicals from the group —OH, —$NH_2$, —COOH and —$SO_3H$; -A-$SO_2$—B;

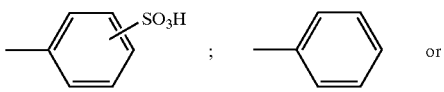

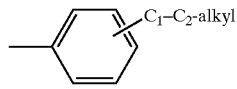

where
- A is a $C_{2-4}$-alkylene group; a $C_{2-4}$-alkylene group which may be interrupted by one or more heteroatoms selected from the group consisting of —O—, —$NR_4$— and —$SO_2$— or a phenylene group; wherein $R_4$ is as defined above;
- B is —CH=$CH_2$ or —$CH_2$—$CH_2$-Z, where Z is any group that is detachable by alkali, preferably —$OSO_3H$ or —Cl; or
- $R_2$ and $R_3$ may be combined with the nitrogen atom to which they are bonded to form a hetero ring of 6 atoms in which an additional heteroatom from the group consisting of O, N and S may be incorporated, and also mixtures thereof and their salts.

Especially preferred compounds have the following formulae (Ia)–(Id)

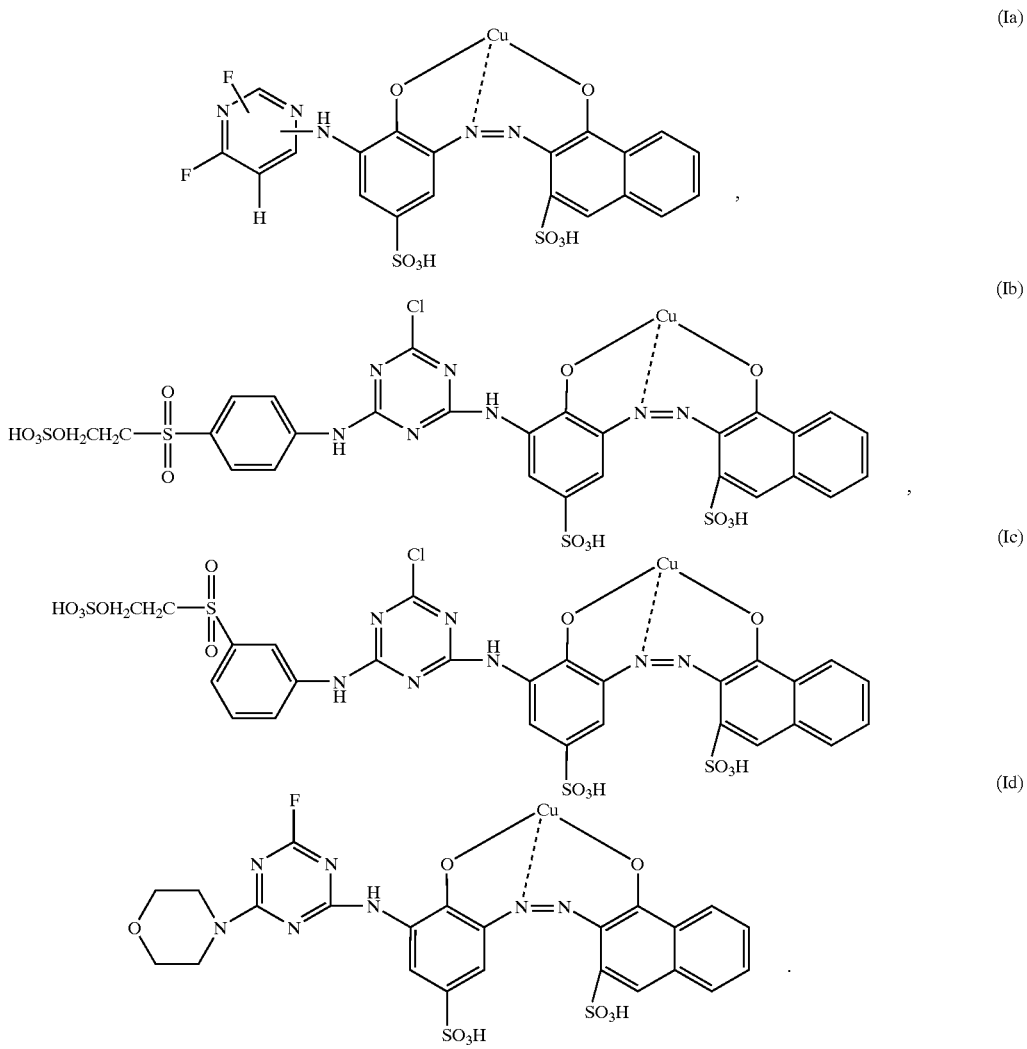

A further aspect of the present invention is the synthesis of the compounds according to the invention, wherein a compound $R_1X$, where $R_1$ and X are each as defined above, is condensed onto a compound of the formula (II)

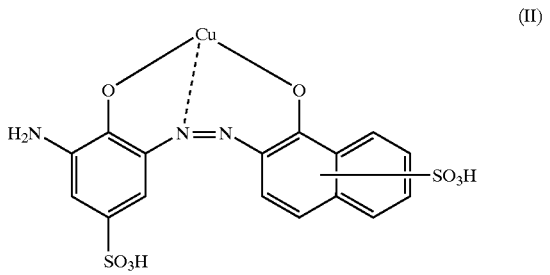

This addition takes place at a pH of 4–8, preferably 5–6. The reaction temperature is between 0 and 60° C., particularly between 0 and 50° C., particularly preferably between 0 and 40° C. The compounds according to the invention are isolated and aftertreated by known methods.

The compounds of the formula (I) and mixtures thereof and their salts are reactive dyes; they are useful for dyeing or printing hydroxyl-containing or nitrogenous organic substrates.

According to a further aspect of the invention there is accordingly provided a process for dyeing or printing hydroxyl-containing or nitrogenous organic substrates by dyeing or printing with the above-defined compounds, their salts or mixtures.

Preferred substrates are leather and fibre materials comprising natural or synthetic polyamides or especially natural or regenerated cellulose, such as cotton, filament viscose or staple viscose. The most preferred substrate is textile material comprising cotton.

According to another aspect of the present invention there is provided the use of the above-defined compounds, their salts or mixtures for dyeing or printing the above-described substrates.

The compounds of the formula (I) can be used in dyeing liquors or in print pastes by all dyeing or printing processes customary for reactive dyes. Preference is given to dyeing by the exhaust process in the temperature range of 60–100° C.

The compounds of the invention can be used as individual dye or else on account of their good compatibility as a combination element with other reactive dyes of the same class that possess comparable dyeing properties, for example their general fastnesses, their exhaustion and fixing value, etc. The combination dyeings obtained show similar fastnesses to the dyeings with the individual dye.

The compounds of the formula (I) provide good exhaustion and fixation values. The unfixed dye portion is readily washed off. The dyeings and prints obtained have good lightfastness. They additionally have good wetfastness properties.

According to a further aspect of the present invention there is provided a hydroxyl-containing or nitrogenous organic substrate that has been dyed or printed by the above-described dyeing or printing process.

Also claimed are substrates, especially cellulose, polyamides and animal fibres, preferably cotton or cotton-containing substrates, that have been dyed with such compounds.

Another claim is to the use of a compound of the formula (I) or mixtures thereof or their salts as a component in an inkjet printing ink.

The examples which follow illustrate the invention.

Percentages and parts are by weight, unless otherwise stated. Temperatures are reported in degrees Celsius.

EXAMPLE 1

50.1 parts of the conventionally prepared copper complex dye of the formula

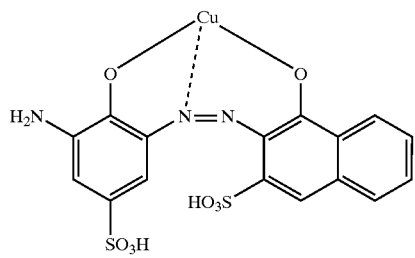

(III)

are dissolved in 700 parts of water by neutralization. 16.1 parts of 2,4,6-trifluoro-pyrimidine are added to the solution, which is stirred at 30–40° C. until amino is no longer detectable. During the reaction, the hydrofluoric acid released is neutralized with 20% sodium carbonate solution. The dye obtained, which conforms to the formula (indicated as the free acid)

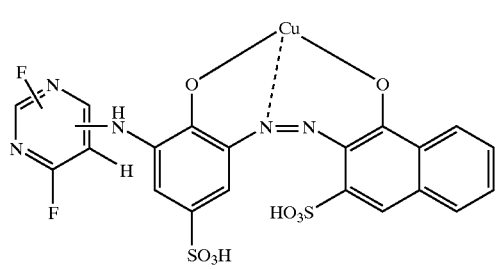

(IV)

is salted out with sodium chloride, filtered off and dried at 50° C. under reduced pressure. On cotton it provides violet dyeings and prints which have good fastnesses and are resistant to oxidative effects.

EXAMPLE 2

18.5 parts of cyanuric chloride are suspended in 100 parts of water and stirred at 0–5° C. for 20 min. 18.1 parts of 4-aminophenyl 2'-sulphatoethyl sulphone are sprinkled into this suspension over 15 min. 20% sodium carbonate solution is metered in to maintain the pH at 3.0–3.55 during the condensation reaction. The resulting compound of the formula (V)

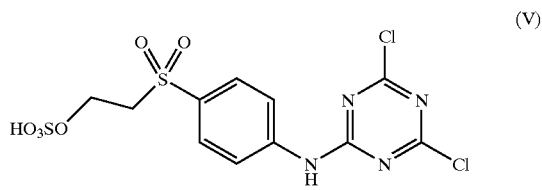

(V)

is not isolated, but pumped in suspension, with stirring, in the course of 30 min, into a solution of 50.1 parts of the aminoazo dye described in Example 1 in 700 parts of water. The pH is maintained at 5.0–6.0 in the process using 20% sodium carbonate solution. After the reaction has ended, the dye of the formula (VI)

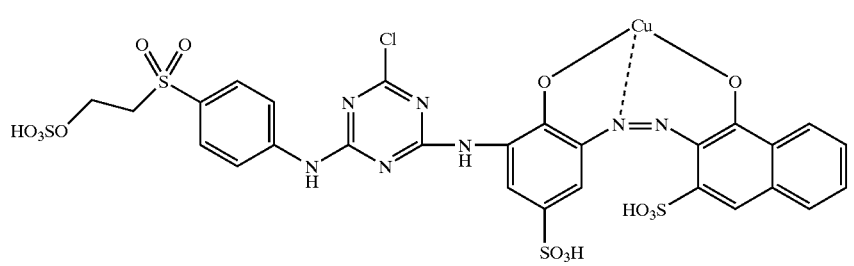

(VI)

is salted out with sodium chloride, filtered off and dried at 50° C. under reduced pressure. On cellulose material and especially on cotton it provides violet dyeings having very good fastness properties and good stability to oxidative influences.

EXAMPLE 3

To a neutral solution of 50.1 parts of the aminoazo dye of the formula (I) described in Example 1 in 700 parts of water are pumped, in the course of 20 min at 0–5° C., 18.5 parts of cyanuric chloride suspended in 100 parts of water while the pH is maintained at 6.0–7.0 by metered addition of 20% sodium carbonate solution. After the reaction has ended, the reaction mixture is warmed to 20–25° C. and admixed with 18.1 parts of 3-aminophenyl 2'-sulphatoethyl sulphone added a little at a time. The reaction product is salted out by conventional method, filtered off and dried at 50° C. under reduced pressure. The dye obtained conforms to the formula (VII)

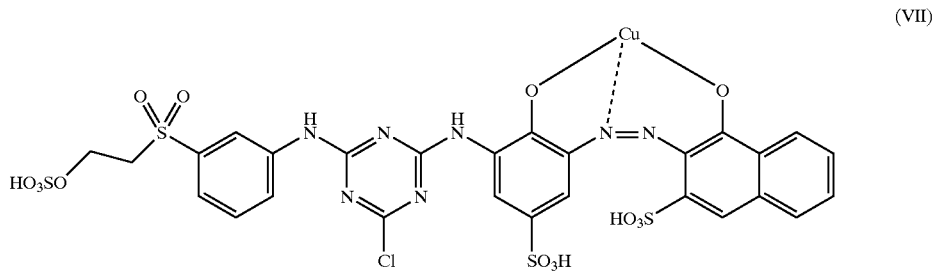

and dyes cotton in violet shades. The dyeings have very good light and wet fastness properties and are stable to oxidative influences.

EXAMPLES 4–14

Further 1:1 copper complex dyes can be prepared from appropriate starting compounds by the methods described in Examples 1–3. All the dyes in Table 1 provide on cotton violet dyeings and prints having very good light and wet fastnesses and are stable to oxidative influences.

TABLE 1

Examples 4–14

| Example | $R_1$ | Position of sulpho group |
|---|---|---|
| 4 | (3,4-dichloro-5-cyano-pyrimidin-2-yl) | 3 |
| 5 | (2,6-difluoro-5-chloro-pyrimidin-4-yl) | 3 |
| 6 | (2,6-difluoro-5-chloro-pyrimidin-4-yl) | 4 |

TABLE 1-continued
Examples 4–14
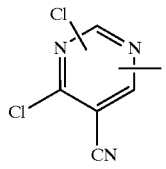
| Example | $R_1$ | Position of sulpho group |
|---|---|---|
| 7 | 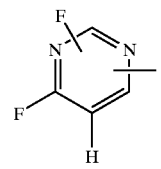 | 4 |
| 8 | 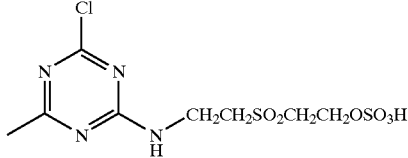 | 4 |
| 9 | 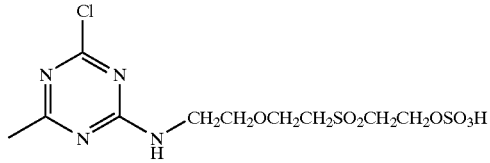 | 3 |
| 10 | 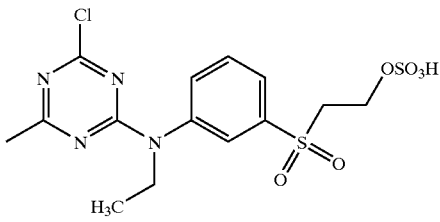 | 3 |
| 11 | 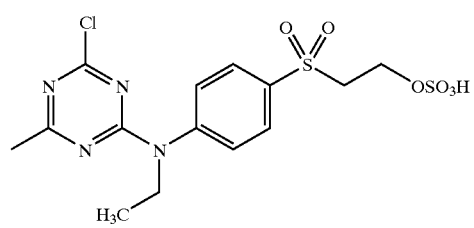 | 3 |
| 12 |  | 3 |

TABLE 1-continued

Examples 4–14

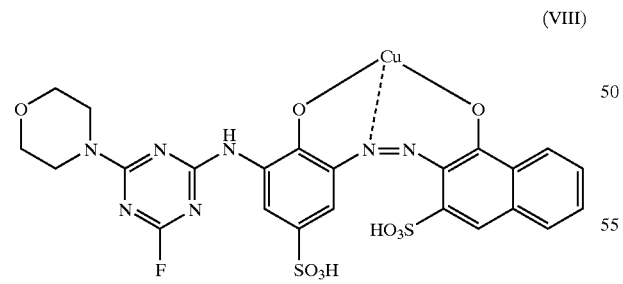

| Example | R₁ | Position of sulpho group |
|---|---|---|
| 13 | (Cl-triazinyl-N(CH₃)-phenyl-SO₂-CH₂CH₂-OSO₃H) | 3 |
| 14 | (Cl-triazinyl-N(CH₃)-phenyl-SO₂-CH₂CH₂-OSO₃H) | 3 |

EXAMPLE 15

50.1 parts of the aminoazo dye described in Example 1 are dissolved in 700 parts of water by neutralization and are reacted with 3.5 parts of 2,4,6-trifluorotriazine as described in EP-A-0 172 790. 8.7 parts of morpholine are added after about 30 min at 0–5° C. and the batch is stirred at 0–5° C. for 4–5 h and then at 10–15° C. until the reaction has ended. The pH is maintained all the while at 6.0–7.0 using 20% sodium carbonate solution. The resulting dye of the formula (VIII)

(VIII)

is salted out with sodium chloride. filtered off with Suction, dried and ground. It dyes cotton in violet shades and has very good light and wet fastness properties and good stability to oxidative influences.

EXAMPLES 16–29

Further dyes are obtained according to the directions of Example 15 by replacing the morpholine with an equivalent amount of the amines recited in Table 2. All these dyes provide on cellulose, especially on cotton, violet dyeings and prints notable for very good light and wet fastnesses and also for resistance to oxidative influences.

TABLE 2

Examples 16–29

| Example | Amine |
|---|---|
| 16 | Aniline |
| 17 | p-Sulphanilic acid |
| 18 | m-Sulphanilic acid |
| 19 | N-Ethyl-o-toluidine |
| 20 | 4-Aminophenyl 2'-sulphatoethyl sulphone |
| 21 | 3-Aminophenyl 2'-sulphatoethyl sulphone |
| 22 | Taurine |
| 23 | H₂NCH₂CH₂CH₂SO₂CH₂CH₂OSO₃H |
| 24 | H₂NCH₂CH₂SO₂CH₂CH₂OSO₃H |
| 25 | H₂NCH₂CH₂OCH₂CH₂SO₂CH₂CH₂OSO₃H |
| 26 | N-Methylethanolamine |
| 27 | Cyclohexylamine |
| 28 | Ethanolamine |
| 29 | o-Toluidine |

APPLICATION EXAMPLE A 0.3 part of the dye of the formula (IV) of EXAMPLE 1 dissolved in 100 parts of demineralized water and 8 parts of Glauber salt (calcined) are added. The dyebath is heated to 50° C. and 10 parts of cotton fabric (bleached) are added. The temperature is maintained at 50° C. during the addition of sodium carbonate. The dyebath is then heated to 60° C. and the dyeing is continued at 60° C. for one hour. The dyed fabric is then rinsed with running cold water for 3 minutes and then with running hot water for 3 minutes. The dyed fabric is then washed in boiling hot demineralized water in the presence of 0.25 part of Marseille soap for 15 minutes. After a further 3 minute rinse with running hot water and a subsequent hydroextraction, the dyed fabric is dried in a drying cabinet at 70° C. The result is a violet dyeing having very good light and wet fastnesses, which is stable to oxidative influences.

APPLICATION EXAMPLE B

A dyebath containing 100 parts of demineralized water and 5 parts of Glauber salt is entered with 10 parts of cotton fabric (bleached). The bath is then heated to 50° C. over 10 minutes and subsequently 0.5 part of the dye of the formula (IV) of Example I is added. After a further 30 minutes at 50° C. 1 part of sodium carbonate (calcined) is added. The dyebath is then heated to 60° C. and the dyeing is continued at 60° C. for a further 45 minutes. The dyed fabric is rinsed first with running cold water and then with hot water and subsequently washed as in Application Example A. The result is a violet dyeing having very good light and wet fastnesses, which is stable to oxidative influences.

The other examples of Tables 1 and 2 or mixtures thereof and or their salts can be used similarly to Application Examples A and B. The result in each case is a violet dyeing having very good light and wet fastnesses, which is stable to oxidative influences.

APPLICATION EXAMPLE C

A print paste consisting of

| 40 | parts of the dye of the formula (IV) of Example 1 |
| 100 | parts of urea |
| 350 | parts of water |
| 500 | parts of a 4% sodium alginate thickener and |
| 10 | parts of sodium bicarbonate |
| 1000 | parts in total | is applied to cotton fabric by known methods. The printed fabric is dried and fixed in steam at 102–104° C. for 4–8 minutes. It is then rinsed first with cold and then with hot water. It is subsequently washed in boiling water as described in Application Example A and then dried. The result is a violet dyeing having very good light and wet fastnesses, which is stable to oxidative influences.

The other examples of Tables 1 and 2 or mixtures thereof and or their salts can be used similarly to Application Example C. The result in each case is a violet dyeing having very good light and wet fastnesses, which is stable to oxidative influences.

APPLICATION EXAMPLE D 2.5 parts of the dye of Example 1 of the formula (IV) are stirred into a mixture of 20 parts of diethylene glycol and 77.5 parts of water at 25° C. The result is a printing ink useful for the inkjet printing process.

The other examples of Tables 1 and 2 or mixtures thereof and or their salts can be used similarly to Application Example D.

What is claimed is:

1. A compound or a mixture of compounds of the formula (I)

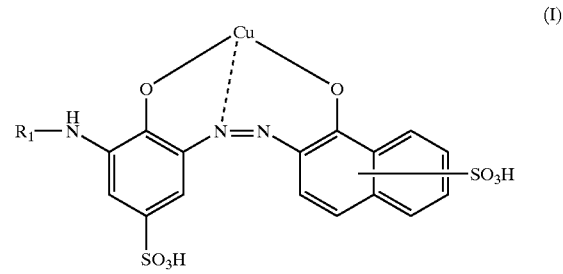

where $R_1$ is

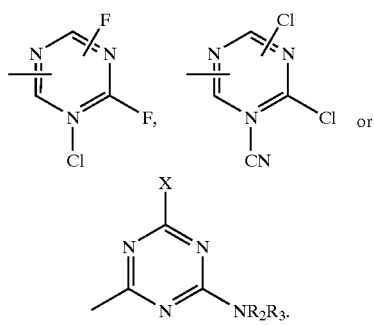

where

X is a chlorine or fluorine atom, and $R_2$ is hydrogen; a $C_{1-2}$-alkyl radical or a $C_{1-2}$-alkyl which is substituted by one or more radicals from the group —OH, —NH$_2$ or —COOH, $R_3$ is a $C_{5-6}$-cycloalkyl radical; a $C_{1-2}$-alkyl which is substituted by one or more radicals from the group —OH, —NH$_2$, —COOH and —SO$_3$H; -A-SO$_2$—B:

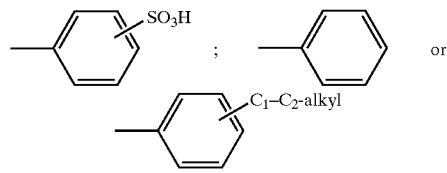

where

A is a $C_{2-4}$-alkylene group; a $C_{2-4}$-alkylene group which may be interrupted by one or more heteroatoms elected from the group consisting of —O—, —NR$_4$— and —SO$_2$— or a phenylene group; wherein $R_4$ is as defined below;

B is —CH=CH$_2$ or —CH$_2$—CH$_2$-Z, where Z is any group that is detachable by alkali;

$R_4$ is hydrogen or a $C_{1-4}$-alkyl radical; or $R_2$ and $R_3$ may be combined with the nitrogen atom to which they are bonded to form a hetero ring of 6 atoms in which an additional heteroatom from the group consisting of O, N and S may be incorporated.

2. A compound or a mixture of compounds of the following formulae (Ib)–(Id) according to claim 1

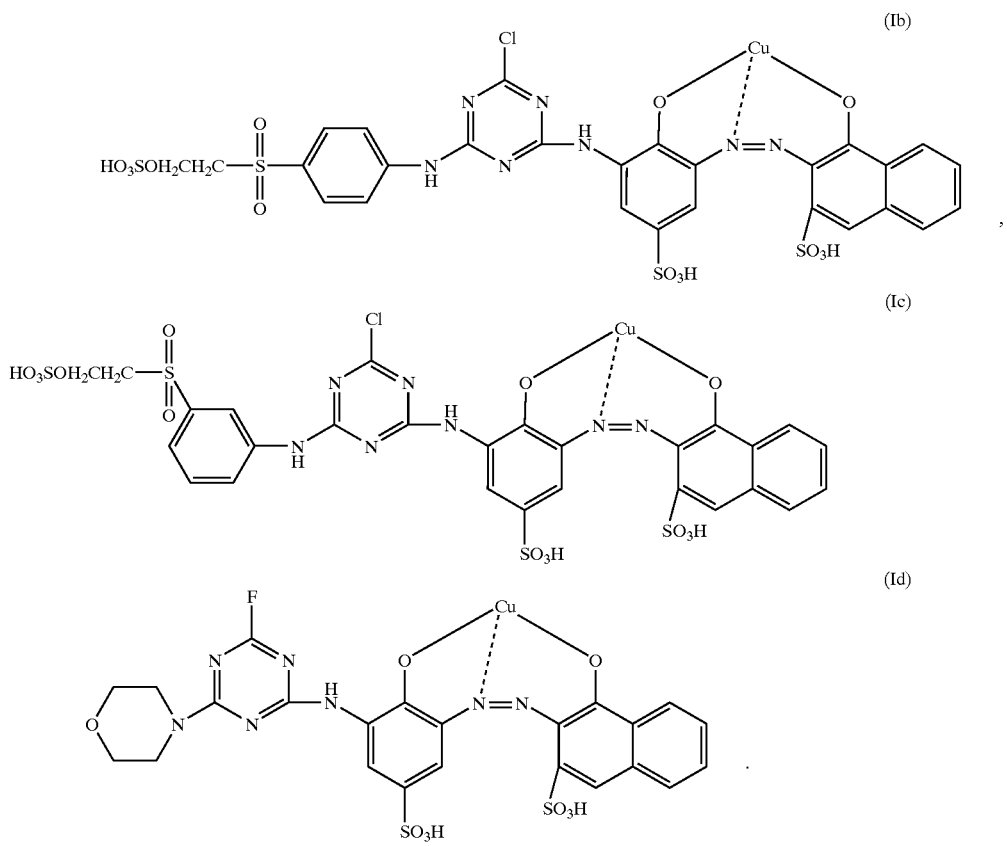

3. Process for preparing a compound according to claim 1, comprising the step of condensing a compound of the formula (II)

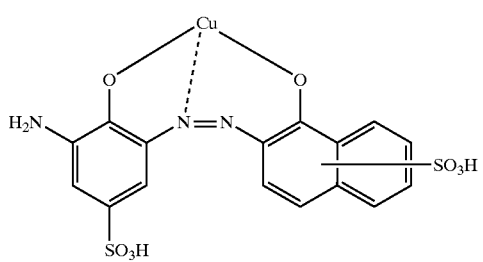

onto a compound $R_1X$, where $R_1$ and X are each as defined in claim 1.

4. A method for dyeing or printing hydroxyl-containing or nitrogenous organic substrate comprising the steps of:

providing a hydroxyl-containing or nitrogenous organic substrate;

providing a compound or a mixture of compounds of the formula (I), (Ib), (Ic) or (Id), or a salt of the formula (I), (Ib), (Ic) or (Id), according to claim 2;

contacting said hydroxyl-containing or nitrogenous organic substrate with the compound or the mixture of compounds of the formula (I), (Ib), (Ic) or (Id), or a salt of the formula (I), (Ib), (Ic) or (Id), according to claim 2 or mixtures thereof.

5. Hydroxyl-containing or nitrogenous organic substrate, dyed or printed by a process according to claim 4.

6. An inkjet printing ink comprising a compound or a mixture of compounds of the formula (I) according to claim 1.

7. A salt of a compound or mixture of compounds according to claim 1.

8. A compound or a mixture of compounds according to claim 1, wherein Z is $OSO_3H$ or Cl.

* * * * *